March 17, 1942.  C. W. HAZELETT  2,276,615
PROCESS FOR MAKING THIN GLASS
Filed April 9, 1938   5 Sheets-Sheet 2

INVENTOR.
CLARENCE W. HAZELETT
BY
ATTORNEY.

March 17, 1942.  C. W. HAZELETT  2,276,615
PROCESS FOR MAKING THIN GLASS
Filed April 9, 1938  5 Sheets-Sheet 4

INVENTOR.
CLARENCE W. HAZELETT
BY
ATTORNEY.

March 17, 1942.  C. W. HAZELETT  2,276,615
PROCESS FOR MAKING THIN GLASS
Filed April 9, 1938     5 Sheets-Sheet 5
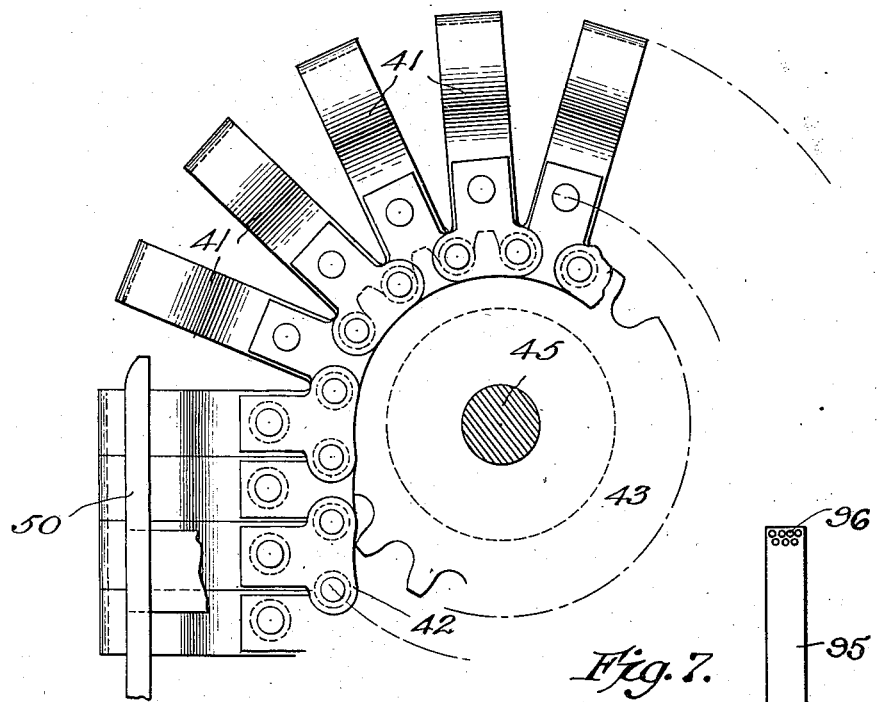
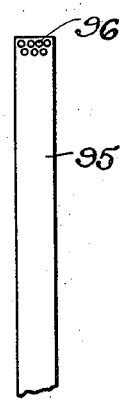
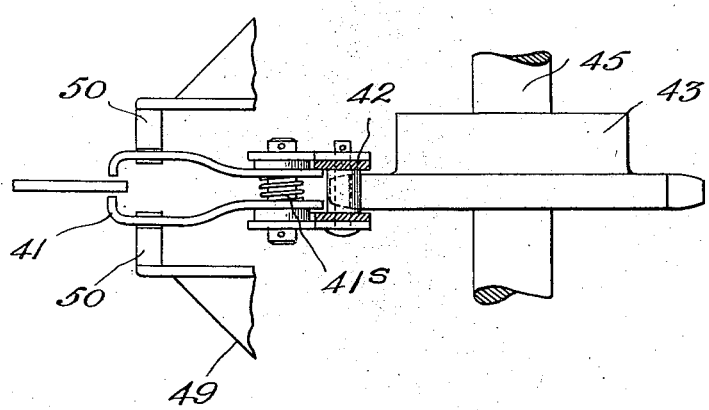
INVENTOR.
CLARENCE W. HAZELETT
BY
ATTORNEY.

Patented Mar. 17, 1942

2,276,615

UNITED STATES PATENT OFFICE 2,276,615

PROCESS FOR MAKING THIN GLASS

Clarence W. Hazelett, Greenwich, Conn.

Application April 9, 1938, Serial No. 201,078

5 Claims. (Cl. 49—83.1)

The present application relates to a process for making thin glass in the form of sheets, strips, films and the like, and, more particularly to a process for making very thin flexible sheet glass continuously.

It is another object of the present invention to provide a process for manufacturing very thin glass continuously in a vertical plane in the form of sheets, strips, films and the like.

It is a further object of the present invention to provide a process for manufacturing flexible glass having critical thinness in the form of sheets, strips, films and the like.

The present invention also contemplates the provision of a glass strip, film or the like having a flexibility as great as a flexible base material, such as Celluloid, wood, steel, Cellophane, and the like to which it may be attached.

Other objects and advantages will become apparent from the following description taken in conjunction with the accompanying drawings, in which:

Fig. 5 is a side elevation of the fingers;

Fig. 6 is a top elevation of a finger; and

Fig. 7 is a top elevational view, somewhat fragmentary in character, of the bait employed in the process of the invention.

Figure 1:
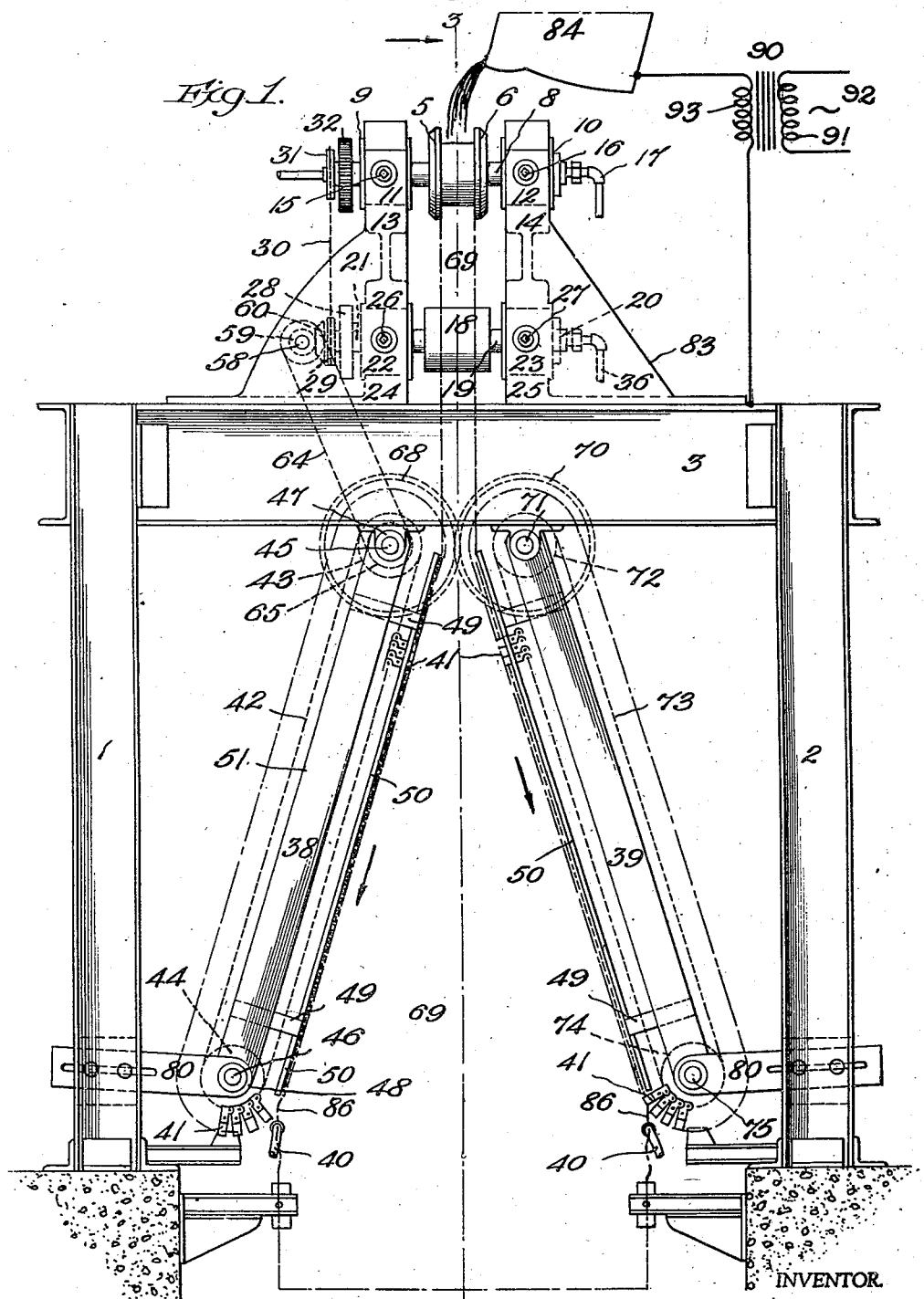
Fig. 1 is a front elevational view of an apparatus embodying the principles of the present invention with parts cut away for purposes of clarity.

The present continuous glass mill for producing glass sheet, strip, film and the like, especially of extremely critical thinness and flexibility comprises, generally speaking, a foundation and supporting members fabricated from concrete or similar material and a steel superstructure fabricated from conventional steel shapes, I-beams etc. readily available in the trade, pressure-forming rolls, lateral drawing elements and vertical drawing elements and vertical drawing members, pouring ladle or heating furnace, power unit and constant speed regulator and power transmission units. An especial characteristic of the present continuous glass mill is the economy with which it may be fabricated. Few special shapes are required since conventional steel or other forms, such as I-beams, etc. may be used. It is to be observed that in the present continuous glass mill the glass sheet, strip or film is formed and drawn in a vertical plane for reasons hereinafter described.

Referring to the drawings, it will be seen that my continuous vertical glass mill is fabricated from standard shapes in an extremely economical manner. A firm mat of concrete or the like is laid down as a foundation upon which the mill is erected. Standard steel shapes, such as columns 1, 2 and 81 and 82 (Fig. 4) and others not shown are used for the vertical members. Standard steel beams 3 or the like are used for the horizontal supporting members. The mill may be divided into two parts for convenience which may be termed the "casting" or "pouring" end or unit and the "drawing" end or unit.

The casting or pouring end or unit comprises two co-operative rolls 4 and 35 which are cooled and form rotatable walls for a bath of molten glass 7. Flanges 5 and 6 may be provided at the ends of roll 4 and act as end walls for the molten glass bath. Between flanges 5 and 6 roll 35 fits snugly but rotatably whereby with roll 4 molten glass may be held in the gap between the bight of the rolls. Roll 4 is mounted on hollow shaft 8 which is journaled in bearings 9 and 10. Bearing boxes 11 and 12 are slidably mounted on horizontal members 13 and 14. By means of screws 15 and 16, roll 4 is moved to and from its companion roll 35 for the purpose of increasing or decreasing the distance between the rolls and thereby increasing or decreasing the initial thickness of the glass product as it is cast and drawn from the bath. Rolls 4 and 35 are cooled in the conventional manner by a cooling medium, preferably water, introduced into the hollow shafts 8 and 34 by means of conduits 17 and 37.

Figure 3:
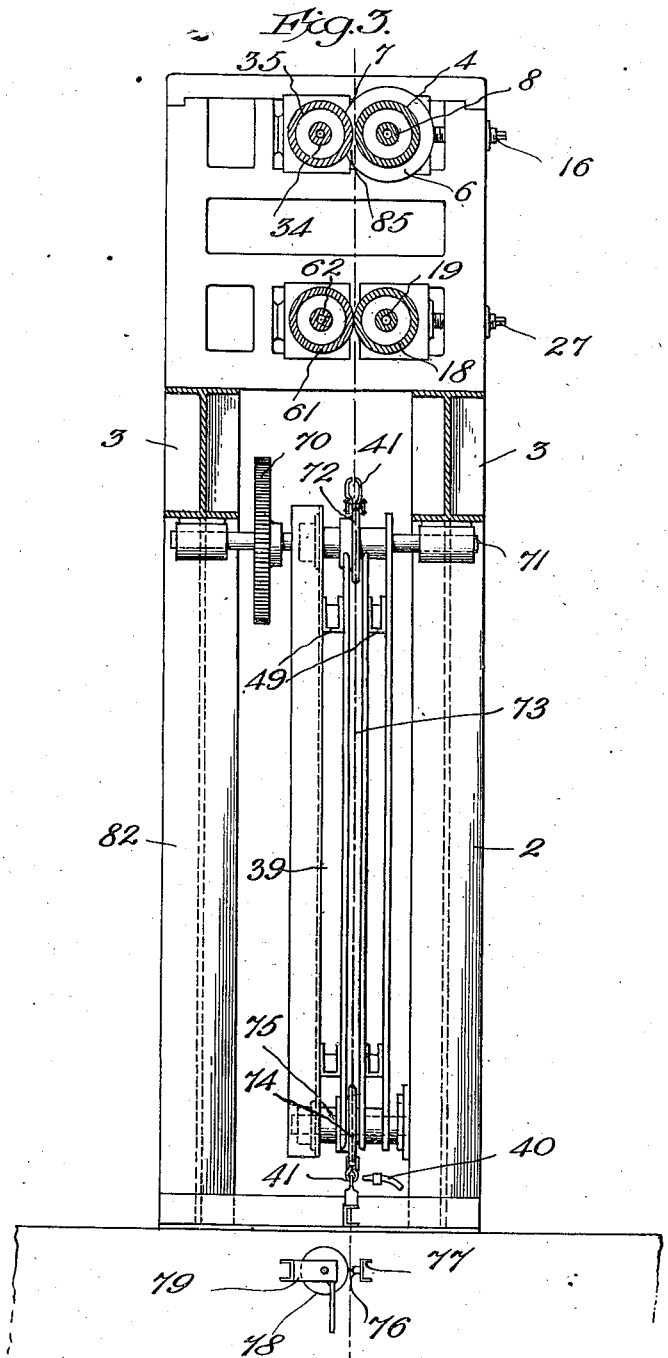
Fig. 3 is a vertical section, taken on the line 3—3 of the new continuous glass mill illustrated in Fig. 1.

The glass product, strip, sheet, thread or the like, 69 passes from the bath rolls 4 and 35 to the drawing end or unit of the mill between another pair of cooled rolls 18 and 61 (Fig. 3). These rolls are likewise mounted on hollow shafts such as 19 and 62 (Figs. 1 and 3). Hollow shaft 19 is provided with means of introducing cooling medium 36 and is journaled in bearings 20 and 21 which are mounted in bearing boxes 22 and 23. These bearing boxes are slideably mounted on elements 24 and 25 and are moved to and from the center line of the mill by means of screws 26 and 27. By adjustment of screws 26 and 27 the distance between rolls 18 and 61 is varied in accordance with the thickness of the glass product. The relative speeds of the upper and lower pairs of rolls may be changed by suitable standard variable speed drives between them. Generally speaking, in order to draw the glass, the lower rolls 18 and 61 are driven at a higher speed than the upper rolls 4 and 35.

The necessary lateral stretching or drawing of the glass product is obtained by means of lateral drawing elements 38 and 39. These drawing elements include an endless chain or belt passing over pulleys and fingers attached thereto together with a drive mechanism. In considering the functioning and structure of these lateral drawing elements, attention is directed particularly to Figs. 1 and 2. The glass is grasped by fingers 41 and others (not shown) which are mounted on an endless chain 42 passing over sprockets 43 and 44 mounted on shafts 45 and 46, respectively. Shafts 45 and 46 are journaled in bearings 47 and 48. Parallel guides 50 are secured to main structural element 51 by brackets 49 and are of such length as to keep fingers 41 closed until the stretching operation is completed. When this operation is completed, the fingers 41 move beyond the ends of guides 50 as may be seen in Fig. 1. The fingers are then opened positively by appropriate means, say springs 41s (Fig. 6) to release the product which now extends between burners 40.

Figure 2:
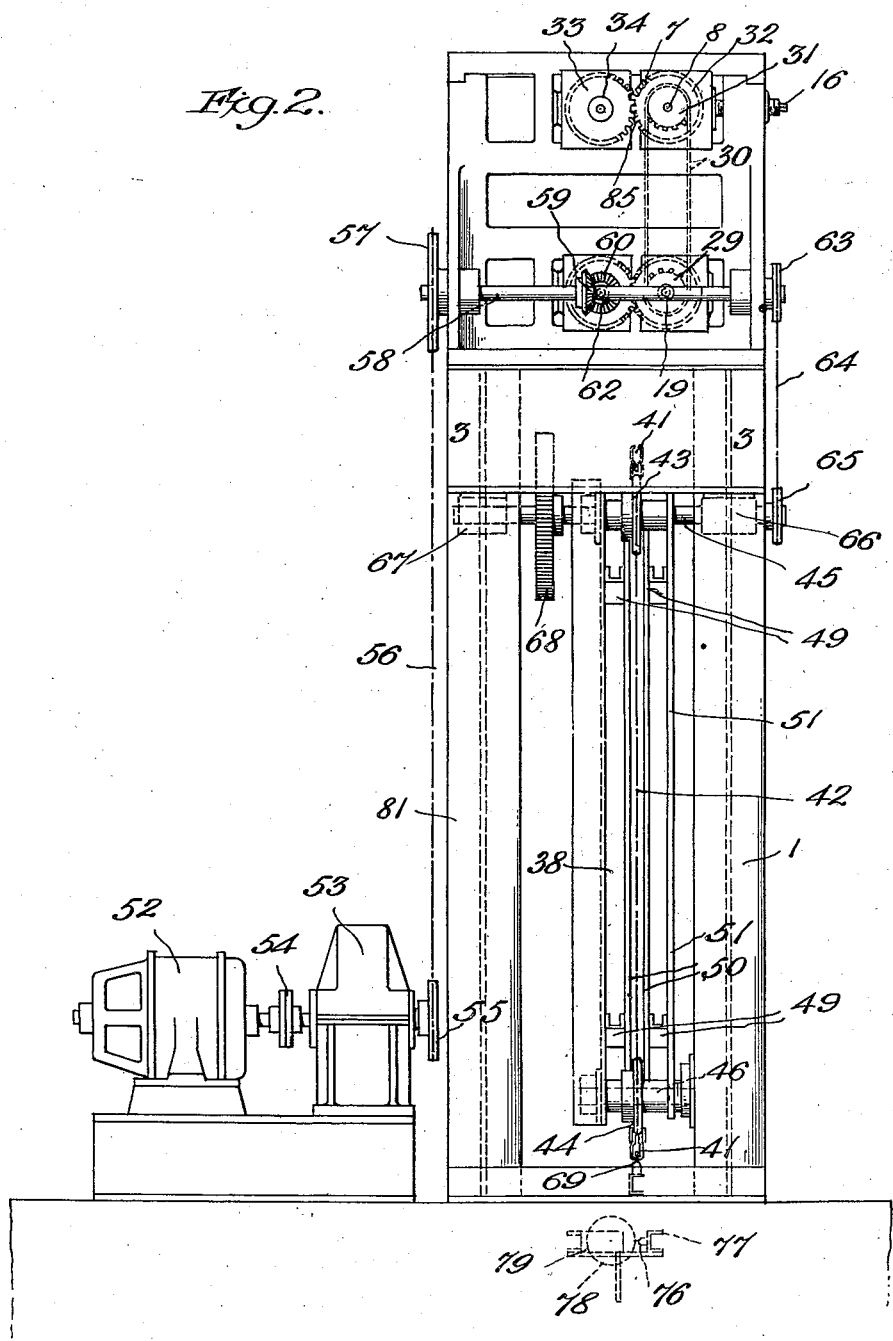
Fig. 2 is a side elevational view of an apparatus embodying the principles of the present invention.

As is readily seen in Fig. 2, all of the power for the mill is derived from a motor 52 driving through speed reducer 53 to which it is directly connected by means of coupling 54. Power is taken off the speed reducer by means of sprocket 55 and chain 56 to sprocket 57. The latter is keyed to shaft 58. Mounted on shaft 58 is a bevel gear 59 engaging gear 60 which is keyed to hollow shaft 62 (Fig. 3). Roll 61 is also keyed to hollow shaft 62. Likewise mounted on shaft 62 is a spur gear (not shown) which meshes with spur gear 28 (Fig. 1) keyed to shaft 19. Pulley 29 is also keyed to shaft 19 and through a belt or chain 30 drives pulley 31. A variable speed device may be installed between pulleys 29 and 31 to change the relation of their speeds. Pulley 31 is keyed to shaft 8 (Fig. 1) as is spur gear 32. Gear 32 engages gear 33 keyed to hollow shaft 34 (Fig. 4) to which roll 35 is also keyed.

Figure 4:
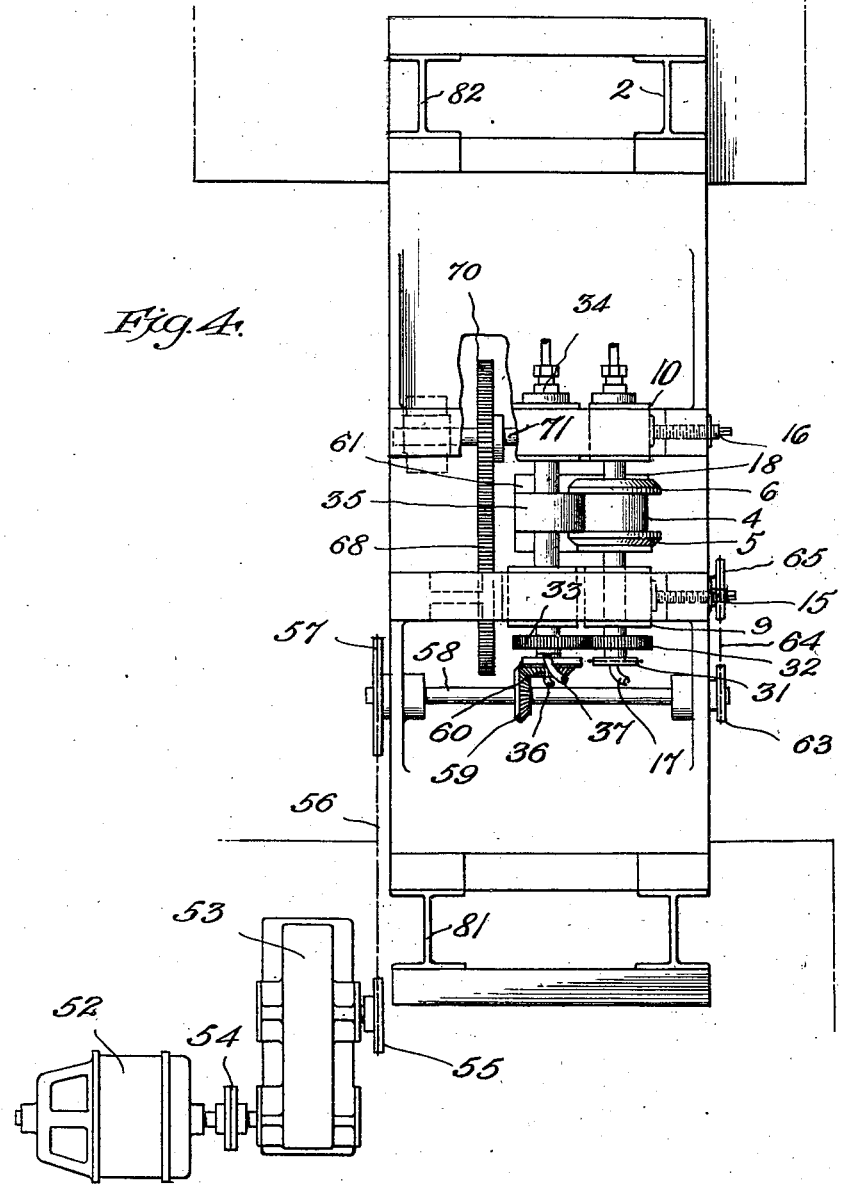
Fig. 4 is a top view of an apparatus embodying the principles of the present invention.

Referring to Fig. 2, the drive from the motor 52 to the pulley 57 keyed to shaft 58 produces movement of pulley 63 which in turn through drive 64 actuates pulley 65. Pulley 65 is keyed to shaft 45 which is journaled in bushings 66 and 67. The bearing boxes 66 and 67 are suspended from structural elements 3. Spur gear 68 is keyed to shaft 45 and engages spur gear 70 (Figs. 1 and 4). Gear 70 (Figs. 1 and 4) is keyed to shaft 71 of the lateral drawing element 39. Sprocket 72 is likewise keyed to shaft 71 and by means of belt or chain 73 drives sprocket 74 keyed to shaft 75. Motion of the various parts of the lateral drawing element 39 is derived from gear 70 which meshes with gear 68 as is best seen in Fig. 1.

In Fig. 4 is clearly shown the arrangement of the driving means for the lateral drawing element 39. Spur gear 68 is driven as described hereinabove and meshes with gear 70 which drives the lateral drawing element 39. In a similar manner the spur gears 32 and 33 which transmit power from pulley 31 to rotate roll 35 are clearly shown. In addition, means 37 for introducing cooling medium into roll 35 is also shown.

Means for shearing the glass product 69 from the scrap edges thereat held in fingers 41 at the critical moment after it has been subjected to the critical amount of lateral stretching are provided as burners, nozzles for water, steam, etc. 40 which impinge on the drawn glass at the edge of the fingers. Further means for shearing the glass edges after the critical amount of lateral stretching has taken place may take the form of a diamond point 76 mounted on an adjustable holder 77 and thereby pressed against the glass product 69 as it is drawn over roll 78 (Figs. 2 and 3). Roll 78 is mounted on a support 79 in such a manner that the glass product bears against the roll and permits the diamond point or its equivalent to score the glass. Of course roll 78 is preferably covered with a resilient material.

The final width and thickness of the glass product is regulated by movement of the lower ends of the lateral drawing elements to and from the center line of the mill by means of adjustable arms 80. A housing for the rolls 18 and 61 and a support for the rolls 4 and 35 is provided by 83. While the critical thickness of the glass product may be controlled by regulating the distance between rolls 4 and 35 in conjunction with the regulation of the distance between rolls 18 and 61, additional control of the vertical stretching and the thickness may also be provided by use of stationary fingers (not shown) disposed intermediate the lateral drawing members 38 and 39 and the guide rolls 18 and 61. These fingers grip the glass product momentarily until the product has been stretched in a direction normal to the axis of the rolls and in the direction of movement sufficiently to reduce the thickness to the desired and necessary extent and then open before too much shrinkage takes place. The elimination of such shrinkage and excess cooling is necessary to avoid tearing the thin products obtained by my mill.

It is to be observed that as a result of driving the entire mill from one source of power, it is possible to obtain the critical synchronization necessary for the production of suitable glass products having the critical thicknesses necessary for flexibility.

In the operation of my continuous vertical glass mill, the glass is prepared or stored in a pouring ladle or furnace 84 which is maintained at a temperature of about 2000° F. to about 2400° F. or at a temperature at which the fluidity of the glass is a maximum without burning. Preferably the glass is kept at the proper temperature while pouring by connecting the ladle 84 or the heating furnace and the mill frame to the secondary winding 93 of a low voltage transformer 90, the primary winding 91 of which is connected to a source of alternating current 92. The stream of glass acts as a resistance connected into the secondary circuit of the transformer and is heated by the current passing therethrough. The glass product is drawn by the use of a bait which is kept under constant tension in the direction in which the glass is drawn. As it appears from Fig. 7, the bait is constituted of a strip of flexible metal 95 having a plurality of holes 96 provided therein at one of its ends. In view of the fact that the operation of a bait of this character is well-known to those skilled in the art, no detailed description thereof will be necessary. After drawing and stretching the glass is severed from the lateral drawing elements and coiled. In order to secure flatness and to increase production the glass is drawn at the lowest possible temperature. Of course this temperature varies with the composition of the glass.

It is to be observed that the glass sheet is drawn or formed at a rate of about 100 to about 400 feet per minute. It is to be observed that all the power is supplied under automatic adjustable control and thus the various portions of the entire mill including longitudinal and lateral drawing means and coiler are operated in a predetermined time relationship.

It is to be appreciated that by drawing or forming the glass in a vertical plane in contradistinction to forming or drawing the glass sheet in a horizontal plane permits forming sheets, strips and films of glass having a much thinner cross section than has been heretofore possible without having the sheet etc. develop waves, ripples, etc. If a very thin sheet of glass is permitted to cool in any form except a plane, it is very friable where irregularities occur.

I establish a pool of molten glass at the bight of a pair of water cooled rolls and draw the film or strip or sheet of glass continuously through the space between the cooled rolls while exerting tension on the cooled glass by means of fingers mounted on a pair of endless chains moving over shafts having axis normal to the line of movement of the glass thread or strip. In this manner, I draw the glass strip, thread or the like from the rolls while subjecting the glass article to tension in the plane of the product and at right angles to the line of movement of the glass product. I maintain the pool of molten glass by continuously adding glass at a temperature of proper fluidity from a ladle 84 or furnace or other storage element. The fingers on the chains chill the glass at the places where they grip the edges of the strip. Means are provided for maintaining a proper pouring temperature in the ladle or furnace during pouring.

Glass is pulled at lowest practical temperature to secure flatness and increase production.

Those skilled in the art will readily understand the operation of my apparatus for the production of threads, strips, sheets, layers of glass and the like from the following description of the process.

I establish a pool of molten glass in a ladle or furnace such as 84. In order to maintain a suitable temperature for pouring and yet not "burn" the glass means is provided for heating the pouring stream coming from the storage receptacle. I prefer to employ the secondary of a low voltage transformer. The secondary of a low voltage transformer may be connected to the pouring ladle 84 or furnace in which the glass is stored after melting and before pouring and to the frame of the mill. Of course other means of supplying controlled means of heating may be used instead of the above such as gas, oil or solid fuel. Before pouring the molten glass which should be at a temperature between about 1800° F. and about 2400° F. a "bait" such as a wire screen or perforated metal strip is placed between the rolls 4 and 35 at the bight 85. The width of the strip, thread, layer or sheet to be produced is governed by the width of the rolls 4 and 35. It is essential that the amount of glass fed to the rolls 4 and 35 be uniform for any given width in order to maintain uniform gauges. For the purpose of adjusting the quantity of glass, roll 4 is movable to and from its mate 35. Movement of roll 4 is obtained by proper movement of the screws 15 and 16. After the "bait" has been placed between the rolls 4 and 35 a pool of glass 7 is established and maintained between the rolls. The roll 4 is then set in motion by means of any source of power applied to pulley 31. The guide rolls and lateral drawing elements simultaneously start revolving. Simultaneously the bait is drawn from the point 85 by any suitable means at a rate depending on the thickness required or any suitable velocity which permits the glass to be chilled rapidly by the water cooled rolls 4 and 35 and 18 and 61. As the molten glass meets the fingers 41 it is compressed between the fingers. I have found that it is necessary to subject the glass to a pulling force acting in directions normal to and in the plane of the path of the moving strip. This pulling force is obtained by means of the movement of the fingers 41. This action together with a drawing tension in the direction in which the strip or sheet of glass is moving is essential for the production of flexible glass. As a result of subjecting the glass to tension in three directions simultaneously while chilling there are no spherical contours in the sheet or in other words the sheet, strip or layer of glass is perfectly flat. The production of perfectly flat glass is necessary to the production of flexible glass. In order to ensure that there will be no waves or ripples in the surface of the sheet, I have found that it is necessary to draw the glass sheets or strips in a manner different from that heretofore found satisfactory. That is, I prefer to chill the glass and draw the sheet in a substantially vertical plane and at a relatively low temperature.

The amount of glass fed to the chilled rolls and drawing fingers must be sufficient to ensure that there will be no open places where the glass is not bound to the drawing means. That is, there must be a continuous bond with the edges of the fingers 41. After passing between the rolls 4 and 35 and after being chilled by the contact with the rolls 18 and 61 and fingers 41, the chilled glass is drawn into the zone of the flames, water jets, steam jets or air jets. The steam, water, air or gaseous or liquid fuel issues from the nozzles 40 placed in such position as to provide a flame, or water, steam or air jet impinging upon the product close to the junction of the stretched product and that part of the sheet which has been chilled by the fingers in such a manner as to separate the stretched product from the scrap edges by cracking or melting at the peripheries of the fingers at 86. The sheet or strip of glass 69 leaving the fingers is kept under slight tension and either coiled or carried to a point where it is continuously bonded to the material which is intended as a support for the strip or sheet of glass. Such supports may be wall board, paper, cloth, steel panels, veneer or transparent supports or the like.

The thickness of the sheet or strip of glass is partially determined and maintained by means of movement of roll 4 to or from roll 35. By means of my apparatus and process it is possible to make sheets or strips of glass of less thickness than has heretofore been possible and having a thickness of 0.015 inch or less. In other words it is possible to make sheets or strips of glass having a thickness and flexibility corresponding to glass fibres or wool.

The sheets or strips of glass produced by the apparatus embodying the principles of my invention do not require grinding to give them a true plane surface. They are substantially free of bubbles, holes and other surface irregularities.

The thickness of the glass is preferably about 0.015 inch or less since sheets or strips of greater thickness are too easily broken. The flexibility of the glass is due in part to the fact that it is chilled so rapidly and reduced to a thickness of less than about 0.015 of an inch. The glass may be applied without grinding to Celluloid for the production of "safety-glass" or to wood, steel, cement, plaster, paper, pulp and the like by means of any suitable adhesive thereby protecting such surfaces from wind, moisture, vermin, combustion, oxidation and to provide an insulating means for reducing the amount of heat exchange through a base support coated in this manner. Combinations such as described above may be used for buildings, inside and out, for walls, ceilings, roofs, furniture, etc. In addition this sheet glass may be used as paints, lacquer or varnishes are used to protect or decorate underlying surfaces. Preferably, the support for the glass should be stronger than the glass. It may be used as a photographic film if suitable emulsions are applied.

Glass of a thickness less than about 0.015 inch may be rolled up on very small diameters without breaking. Composite products or articles produced in the manner described hereinabove have a flexibility approximately the same as that of the glass support, base or core.

Although the present invention has been described in conjunction with a preferred embodiment variations and modifications may be made as will be readily understood by those skilled in the art. Such variations and modifications are to be considered within the purview of the specification and the scope of the appended claims.

I claim:

1. The process for producing flexible glass having a critically reduced thickness of not more than about 0.015 inch which comprises establishing a bath of molten glass having a temperature of about 1800° F. to about 2400° F. between a pair of adjacent and operatively associated rolls and contiguous to a bait, maintaining the temperature of said bath and the level of said bath substantially constant, drawing said bait and the glass attached thereto through the bight of said associated rolls to form a chilled element, drawing said bait and attached chilled element through the bight of a second pair of operatively associated rolls while the glass is still plastic, and subjecting said chilled element while the glass is still in a plastic condition to lateral stretching in directions normal to that of drawing until the width of said chilled element has been increased to a multiple of its original width and its thickness has been reduced to said critical thickness.

2. The process for producing flexible glass having a critically reduced thickness of not more than about 0.015 inch which comprises establishing a bath of molten glass having a temperature of about 1800° F. to about 2400° F. between a pair of adjacent and operatively associated rolls and contiguous to a bait, maintaining the temperature of said bath and the level of said bath substantially constant, drawing said bait and the glass attached thereto vertically downward through the bight of said associated rolls to form a chilled element, drawing said bait and attached chilled element through the bight of a second pair of operatively associated rolls while the glass is still plastic, and subjecting said chilled element while the glass is still in a plastic condition to lateral stretching in directions normal to that of drawing whilst drawing said bait and attached chilled element vertically downward at a speed of about 100 to about 400 feet per minute until the width of said chilled element has been increased to a multiple of its original width and its thickness has been reduced to said critical thickness.

3. The process for producing flexible glass having a critically reduced thickness of not more than about 0.015 inch which comprises establishing a bath of molten glass in the bight of two adjacent and operatively associated cooled rolls, said bath having a temperature of about 1800° F. to about 2400° F., drawing portions of said molten glass as a continuous element through the bight of said chilled rolls to form a chilled element, drawing said chilled element through the bight of a second pair of operatively associated cooled rolls, and while the glass is still plastic, continuing to draw said chilled element vertically downward while subjecting said chilled element to lateral stretching by pulling the lateral marginal portions of said element in opposite directions normal to the line of drawing of said chilled element and in the plane of said chilled element until the width of said element has been increased to a multiple of its original width, and subsequently releasing said stretched and chilled element from the application of said lateral stretching whereby a flexible glass element having said critically reduced thickness is produced.

4. In the process for producing flexible glass in the form of sheets, strips, films and the like having a critically reduced thickness of not more than about 0.015 inch and a substantially constant cross section, the improvement which comprises continuously forming sheets and the like of glass from a molten supply thereof, drawing said sheets vertically downward, subjecting said sheets and the like whilst being drawn vertically downward to transverse stretching by pulling apart the lateral marginal portions thereof in the plane of said sheets until their width has been increased to a multiple of their original width, and controlling chilling of said sheets during said forming of the sheets to a critical extent to retain sufficient stretchability for said drawing and stretching operations whereby flexible glass sheets, strips and films having critically reduced thickness of not more than about 0.015 inch are produced.

5. In the process for producing flexible glass in the form of sheets, strips, films and the like having a critically reduced thickness of not more than about 0.015 inch and a substantially constant cross section, the improvement which comprises continuously forming sheets and the like of glass from partially chilled molten glass, drawing said sheets vertically downward, while further chilling said sheets, subjecting said chilled sheets to longitudinal stretching in the direction of drawing and in the plane of the sheets while the glass is still plastic, and simultaneously, whilst stretching said chilled sheets and the like vertically downward, subjecting said chilled sheets and the like to transverse stretching by pulling apart the lateral marginal portions thereof in the plane of said sheets until their width has been increased to a multiple of their original width whereby flexible glass sheets, strips and films having critically reduced thickness of not more than about 0.015 inch are produced.

CLARENCE W. HAZELETT.